Nov. 6, 1923.
J. H. HAMMOND, JR
1,473,149
SYSTEM FOR CONTROLLING MOVING BODIES FROM A DISTANCE
Original Filed Aug. 3, 1918   3 Sheets-Sheet 1
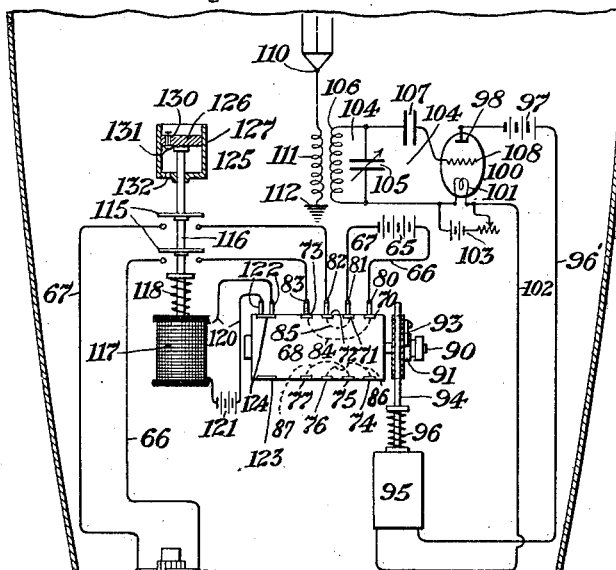
Fig.1
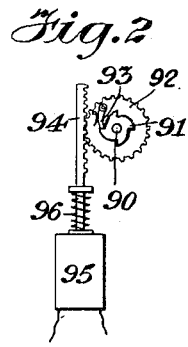
Fig.2
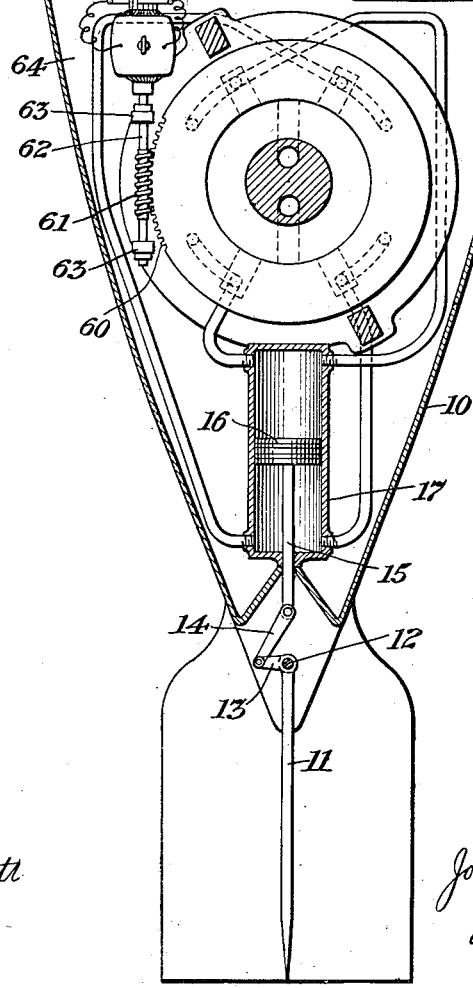
WITNESS
Chas. J. Clagett
INVENTOR
John Hays Hammond Jr.
BY
A. J. Gardner
HIS ATTORNEY

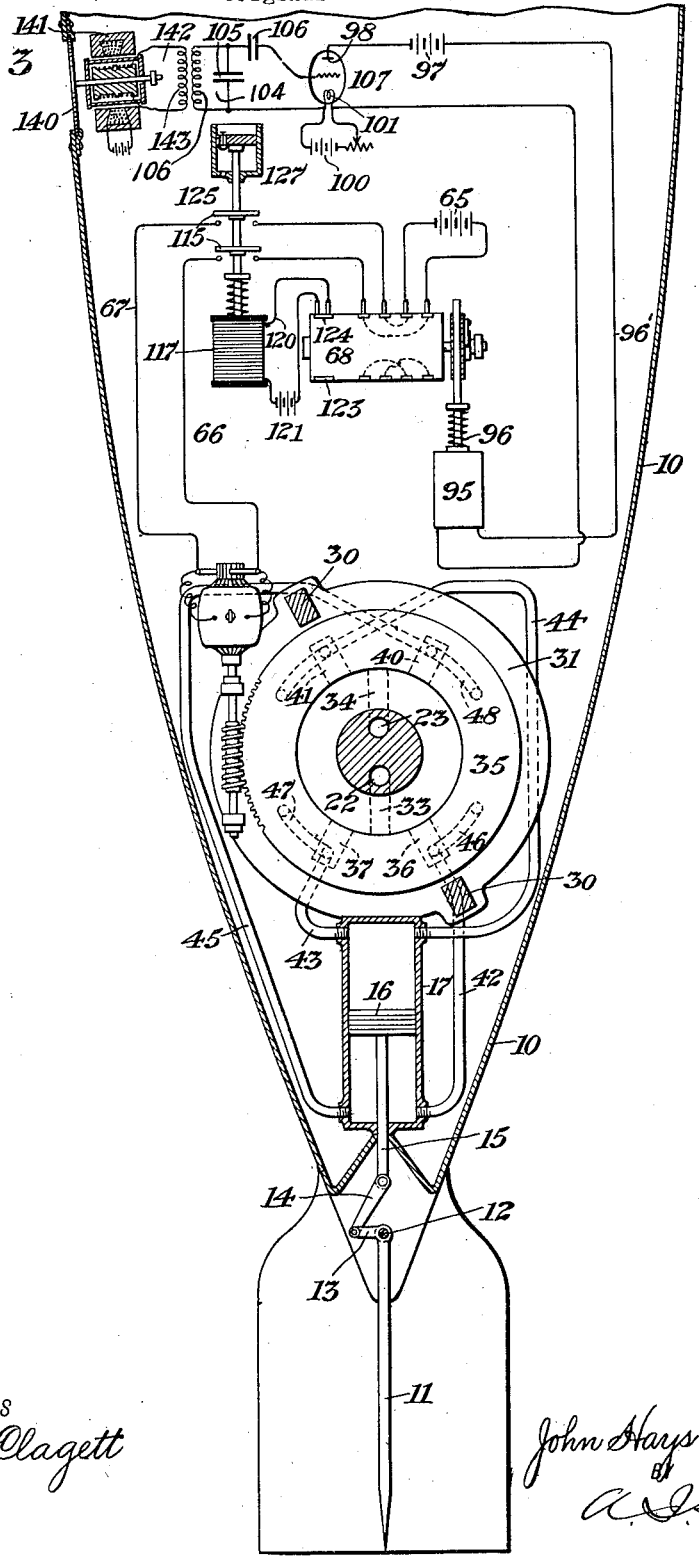

Nov. 6, 1923.  
J. H. HAMMOND, JR  
1,473,149  
SYSTEM FOR CONTROLLING MOVING BODIES FROM A DISTANCE  
Original Filed Aug. 3, 1918  3 Sheets-Sheet 3
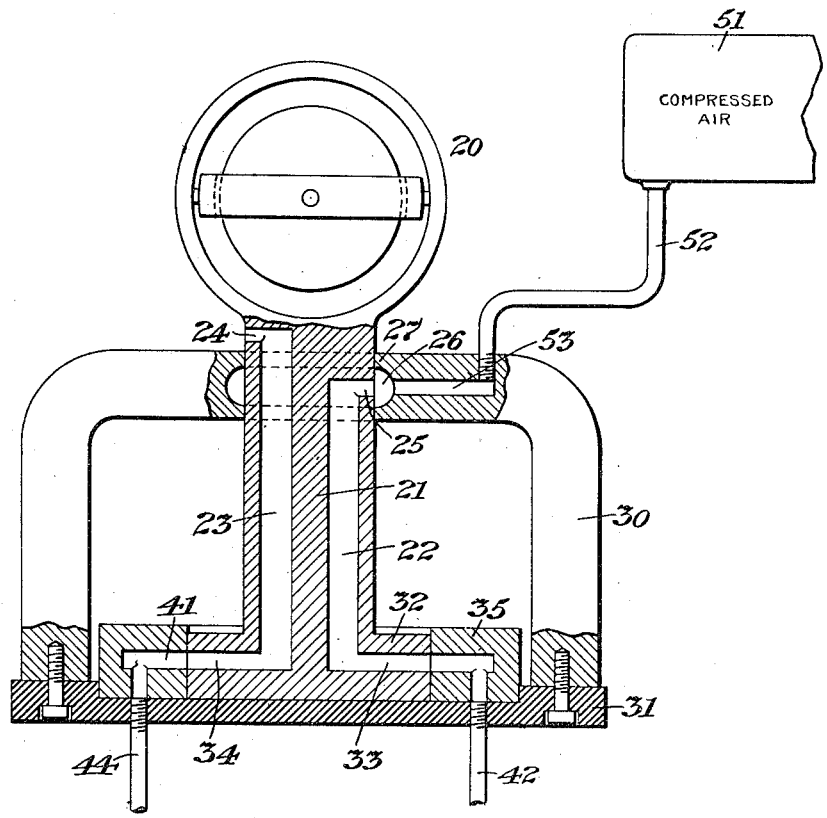

Patented Nov. 6, 1923.

1,473,149

UNITED STATES PATENT OFFICE.

JOHN HAYS HAMMOND, JR., OF GLOUCESTER, MASSACHUSETTS.

SYSTEM FOR CONTROLLING MOVING BODIES FROM A DISTANCE.

Application filed August 3, 1918, Serial No. 248,124. Renewed August 10, 1921. Serial No. 491,288.

*To all whom it may concern:*

Be it known that I, JOHN HAYS HAMMOND, Jr., a citizen of the United States, and a resident of Gloucester, county of Essex, State of Massachusetts, have invented certain new and useful Improvements in Systems for Controlling Moving Bodies from a Distance, of which the following is a specification.

Some of the objects of the present invention are to provide means for maintaining a definite, predetermined or fixed direction of movement of a movable body, such as a vessel, a torpedo or other type; to provide means for automatically controlling a movable body to maintain the body upon a predetermined fixed course; to provide means operated from a distance to relieve the automatic control and place the body under control of a distant operator for varying the course of the body at will; to provide means responsive to impulses of radiant energy for controlling the direction of movement of a movable body at will; to provide means for delaying the action of the radiant energy responsive means until the parts have been automatically set to cause the steering means to move in the proper direction to guide the body upon the desired course; and to provide other improvements as will hereinafter appear.

In the accompanying drawings, Fig. 1 represents a transverse section of that portion of a dirigible body provided with one form of the present invention; Fig. 2 represents an end view of one of the control devices; Fig. 3 represents a section similar to that of Fig. 1 but showing a modified form of the present invention; and Fig. 4 represents in partial section and partial elevation a portion of the control valve mechanism.

Referring to the drawings, one form of the invention is shown wherein a dirigible body 10 such as a vessel, torpedo, or the like, is provided with a rudder 11 mounted for swinging movement upon a vertical axis 12 fixed to the stern of the body 10.

For causing the rudder 11 to move in one direction or the other to steer the body 10 as desired, a crank arm 13 is secured to the rudder 11 and joins a connecting link 14 which has pivoted engagement with a piston rod 15 attached to a piston 16. The piston rod 15 projects through the end of a cylinder 17 in which the piston 16 is adapted to reciprocate, and consequently pressure fluid admitted to the cylinder 17 to one side or the other of the piston 16 will cause the latter to travel as required and then shift the rudder.

For the purpose of admitting pressure fluid to the cylinder 17 and exhausting the same therefrom automatically to maintain the vessel upon a predetermined course a control mechanism is utilized employing a stabilizing device 20, here indicated diagrammatically as a gyroscope having a shaft 21 fixed in space by the action of the stabilizer. This shaft 21 is provided with a pair of passages 22 and 23, extending longitudinally of the shaft 21 one of which, say 22, serves as an admission passage for pressure fluid and the other, 23, serves as an exhaust passage. This latter terminates in an outlet 24 through the side of the shaft 21 while the former has an inlet opening 25 through the shaft 21 communicating with a continuous groove or channel 26 formed in a hub bearing 27 which is supported by suitable uprights 30 from a fixed part 31 of the vessel body. The end of the shaft 21 opposite to the stabilizer 20 is enlarged in the form of a circular flange 32 forming a base which rests freely upon the part 31 and is provided with two laterally disposed radial passages 33 and 34, which are respectively continuations of the passages 22 and 23, and are arranged to open against the encircling wall of a ring 35 mounted upon the part 31 and bounding the base flange 32. This ring 35 is provided with two ports 36 and 37, each arranged to separately communicate at one end with the pressure fluid inlet passage 33 in certain positions of the ring 35, and also provided with two ports 40 and 41 each arranged to separately communicate at one end with the passage 34 leading to the exhaust 24. The other ends of the respective ports 36 and 37 are connected respectively to supply pipes 42 and 43 having communication with the cylinder 17 at opposite sides of the piston 16, while the other ends of the respective ports 40 and 41 are connected respectively to exhaust pipes 44 and 45 likewise communicating with the cylinder 17 at opposite sides of the piston 16.

The ports 36, 37, 40 and 41 are provided respectively with circumferential extension channels 46, 47, 48 and 49 of a length substantially equal to the arc of travel of the ring 35 under adverse conditions, and the function of each is to insure communication between the inlet and outlet passages 22 and 23 and the respective pipes 42, 43, 44 and 45.

Fluid pressure in the form of compressed air is here employed as a motive agent and is stored in a tank 51 having free communication with the groove 26 by way of a pipe 52 and passage 53, the latter being suitably formed in the support 30.

The operation of the automatic control for maintaining the movable body upon a predetermined course is as follows: Assuming the vessel 10 to be traveling straight ahead upon a prescribed course the control parts are in the position shown in Fig. 1, the admission and exhaust passages 33 and 34 being closed since they now open against the inner juxtaposed wall of the ring 35. In consequence the piston 16 is in neutral position within the cylinder 17 and the rudder 11 is correctly held to direct the vessel upon the predetermined course. The stabilizer 20 is in operation and maintains the shaft 21 fixed in space so that any movement of the vessel 10 away from the desired course will result in a partial rotation of the ring 35 with respect to the fixed shaft 21. This follows because the ring 35 is frictionally held by the part 31 which is secured to the body of the vessel 10. Assuming the vessel 10 is deflected to the right from its true course, then the ring 35 will swing clockwise about the fixed shaft 21 and thus bring the port 36 into communication with the inlet passage 33 and the port 41 into communication with the exhaust passage 34. The pressure fluid thus has free flow from the reservoir 51 by way of the pipe 52, passage 53, groove 26, inlet passages 22 and 33, port 36, extension channel 46 and pipe 42 to the end of the cylinder 17 which will cause the piston 16 to move in the direction to swing the rudder 11 in a clockwise direction to return the vessel 10 to the prescribed course. The opposite end of the cylinder 17 has simultaneously been thrown into communication with the exhaust by way of pipe 44, channel 49, port 41, passages 34 and 23 and outlet 24.

Should the vessel 10 deviate to the left from the set course the ring 35 will be swung counter-clockwise and thereby establish communication between the port 37 and passage 33 to admit pressure fluid in the same manner to the pipe 43 and between the port 40 and passage 34 to exhaust in the same manner by way of pipe 45. This causes the piston 16 to shift the rudder 11 counter-clockwise to bring the vessel 10 back to its set course.

For the purpose of controlling the direction of movement of the vessel 10 at will from a distance one form of the present invention contemplates operating the movable ring 35 by means responsive to electroradiant energy, and to that end a portion of the periphery of the ring 35 is provided with a segmental worm gear 60 in mesh with a worm 61 formed on a shaft 62, which is suitably journalled in fixed bearings 63.

In order to rotate the shaft 62 in either direction, to thus turn the ring 35 either clockwise or counterclockwise according to requirements, a motor 64 is employed having its armature shaft preferably extended as the shaft 62. Current is supplied to the motor 64 from a suitable source such as a battery 65, by way of the conductors 66 and 67, and these latter are interrupted by a reversing switch in the form of a rotatable commutator 68, the body portion of which is of insulating material provided with two sets of contacts 70, 71, 72 and 73, and 74, 75, 76 and 77 arranged at diametrically opposite points on the circumference of the commutator cylinder and both sets having their respective contacts in axial alinement, while the opposed contacts of the two sets are respectively in position to be engaged by a brush of a set of brushes 80, 81, 82 and 83 forming terminals for the respective conductors.

In order to reverse the direction of current flow to thereby rotate the motor armature as desired, the contacts 70 and 73 are electrically connected by a conductor 84 and the contacts 71 and 72 are electrically connected by a conductor 85 so that when in contact with the several brushes 80, 81, 82 and 83 the motor will be driven in one direction. To cause a reversal of the current flow the contacts 74 and 76 are electrically connected by a conductor 86 and the contacts 75 and 77 are electrically connected by a conductor 87 so that when in contact with the several brushes 80, 81, 82 and 83 the motor will be driven in the opposite direction.

For the purpose of imparting a step by step movement to the commutator 68 to bring one or the other set of contacts into engagement with the several brushes, or to break contact entirely by causing the commutator to come to rest with the brushes riding on the insulated surface, the commutator 68 has its shaft 90 projecting at one end and carrying a four toothed ratchet 91 which is keyed or otherwise fixedly secured thereto. Mounted on the shaft 90 adjacent the ratchet 91 is a gear 92 which is arranged to turn freely upon the shaft 90 and carries a spring pressed pivoted pawl 93 normally held in contact with the ratchet 91 to successively engage its teeth and cause turning movement as required. The gear 92 is operated by a rack 94 formed as an extension of the core of a solenoid 95, the said core being normally pressed outwardly by a spring 96 but being drawn inwardly, as will be understood, upon energization of the solenoid 95.

In order to energize the solenoid 95 in response to signals transmitted from a distance it is located in a circuit including a conductor 96', battery 97 and plate 98 of a dectector 100, here shown as of the evacuated glass bulb type, having a filament 101 and a conductor 102. The filament 101 of the detector 100 is maintained in heated condition by a local circuit including a battery 103. The detector 100 is controlled by a closed oscillatory circuit 104 including a variable condenser 105, and a secondary coil 106. One side of this circuit 104 is connected through a stoppage condenser 107 to the grid 108 of the detector 100, and the other side of the circuit 104 is connected to the filament 101. The closed circuit 104 is arranged to be energized by an open aerial circuit including an antenna 110 and an inductance 111, grounded as at 112. The closed oscillatory circuit 104 is tuned to the frequency of the impulse of radiant energy received by the open aerial circuit 110, 111.

For the purpose of delaying the response of the steering mechanism to a signal from a distance for a fraction of time in order to allow the control device to be set so that the proper resulting action may take place, the motor circuit is provided with a switch 115 arranged to make and break connections in the two conductors 66 and 67 by means of a reciprocable core 116 which is operated by a solenoid 117 and a spring 118, the latter normally holding the switch 115 in the position shown in Fig. 1 with the circuit broken. The solenoid 117 is in a circuit 120 including a battery 121 and two brush terminals 122, these latter being arranged to ride on the periphery of the communtator 68 in the path of a pair of contacts 123 and 124 each of which is arranged to make electrical connection between the brushes 122 when in contact position, and also are respectively arranged in longitudinal alinement with the sets of contacts governing the motor circuit. Thus, when the contacts 70 to 73 inclusive are positioned to engage the brushes 80 to 83 respectively, then the contact 124 will also be in position to close the solenoid circuit 120 by bridging the terminals 122. The response of the core 116 to the energization of the solenoid 117 is delayed by a suitable dash-pot 125 consisting, in the form here shown, of a plunger 126 fast to and movable with the core 116 and located in an open ended cylinder 127. This plunger 126 is provided with an opening 130 therethrough controlled by an inwardly opening check valve 131 and the closed end of the cylinder 127 has a restricted opening 132 to retard the escape of air as the plunger 126 moves inward under the action of the solenoid 117.

In explaining the operation of the delayed switch control it will be assumed, first that the commutator 68 is in a neutral position, that is with the motor circuit brushes resting upon the insulated part of the commutator, and the set of contacts next to engage the brushes are those to set the steering mechanism to turn the dirigible body to the right. The predetermined operating signal is now transmitted, whereupon the solenoid 95 is energized and the commutator 68 given a quarter turn to bring the set of contacts into engagement with the brushes 80 to 83 and 122. This first closes the circuit 120 and energizes the solenoid 117 so that the core 116 moves in a direction to cause the switch 115 to close the motor circuit and thus set the steering mechanism as required for the determined course. The switch 115 is delayed an appreciable interval by the slow movement of the plunger 126 due to the escape of the air through the restricted opening 132, but in this instance is without effect upon the ultimate result produced by the one signal since the parts were initially in position to respond for the desired direction of movement.

Secondly, it will be assumed that the commutator 68 is in a neutral position as before, with the set of contacts to next engage the brushes being those to cause the dirigible body to turn to the right, and it is desired to send a signal which will direct a body to the left. A signal is therefore transmitted as before to bring the set of contacts into engagement with the brushes 80 to 83 and 122, but in this instance a second signal is sent out and received before the switch 115, because of its delayed action, has had time to close the motor circuit. The result, therefore, is to continue the turning of the commutator 68 and bring it to another neutral position.

Now the set of contacts which will engage the brushes 80 to 83 and 122, upon another turn of the commutator, are those to set the steering mechanism for a movement of the body to the left as required, and consequently a third signal is now transmitted and the parts respond, as heretofore explained, with the result that the body is directed in the predetermined manner.

In the form of the invention shown in Fig. 3, the electrical circuits and the means for controlling the steering of the body from a distance are preferably similar to the form heretofore described, but in this instance the receiving apparatus upon the dirigible body is responsive to compressional waves instead of impulses of electroradiant energy.

For receiving such compressional waves, for example, submerged sound waves, the dirigible body is provided with a vibratory member or diaphragm 140 mounted upon the body 10 in a suitable submerged position to be readily affected by signals of the predetermined character. This diaphragm 140 is connected to an electromagnetic oscillator 141 of any well known type, which is tuned to the frequency of the signals transmitted from the distant station. The vibratory action of the oscillator 141 produces a current in an oscillatory circuit 142 including a primary coil 143 which induces a similar current in the secondary 107 of the closed oscillatory circuit 104. In this manner the signals transmitted as compressional waves are transformed into a unidirectional current for controlling the steering mechanism of a dirigible body at will from a distance.

While the foregoing description has reference more particularly to the control of a torpedo from a distance, it should be understood that this is only by way of example, as the invention is broadly to the control of dirigible bodies generally and therefore is not to be restricted to the particular form of device here shown.

Having thus described my invention, I claim and desire to protect by Letters Patent:

1. A system for controlling the operation of dirigible bodies at a distance by radiant energy having in combination a movable body to be propelled, a steering mechanism, means including a motor and circuit therefor for operating said steering means in either direction, means responsive to radiant energy transmitted from a distance for varying the direction of current at will in said motor circuit, and means for closing said circuit a predetermined interval after the responsive means receives a signal.

2. A system for controlling the operation of dirigible bodies at a distance by radiant energy having in combination a movable body to be propelled, a steering mechanism, means including a motor and circuit therefor for operating said steering means in either direction, means responsive to radiant energy transmitted from a distance for varying the direction of current at will in said motor circuit, and means including a dashpot for closing said circuit after the responsive means receives a signal.

3. The combination with a movable body, of an element carried thereby and rotated in either direction with respect to said body about a predetermined axis, a second element rotatable about said axis in either direction and arranged to co-operate with said first mentioned element, stabilizing means arranged to hold said second element against rotation in space about said axis, a single source of power arranged to rotate said first mentioned element in either of said directions and means responsive to electric impulses for causing said source of power to be rotated selectively in one direction or in the opposite direction.

4. A system for controlling the operation of dirigible bodies at a distance by radiant energy having in combination a movable body having a gyroscope to maintain a predetermined direction of bodily movement thereof, a member maintained fixed in space by said gyroscope, a ring rotatable about said member as an axis and frictionally engaged by said body, a rudder means, said fixed member and ring having passages for the pressure fluid, said passage being normally out of register, means including a worm and worm rack for turning said ring in either direction, and means responsive to radiant energy from a distance to control the operation of said worm means to turn said ring at will to admit pressure fluid to a predetermined passage to operate said rudder means in a predetermined direction.

5. A system for controlling the operation of dirigible bodies at a distance by radiant energy having in combination a movable body having a gyroscope to maintain a predetermined direction of bodily movement thereof, a member maintained fixed in space by said gyroscope, a ring rotatable about said member as an axis and frictionally engaged by said body, a rudder means, said fixed member and ring having passages for the pressure fluid, said passages being normally out of register, means including a worm for turning said ring in either direction, means responsive to radiant energy from a distance to control the operation of said worm operating means to turn said ring at will to admit pressure fluid to a predetermined passage to operate said rudder means in a predetermined manner, and means to delay the action of said worm operating means in response to a signal received by said responsive means.

6. The combination with a fluid distributing element rotatable either in one direction or in a contrasting direction, of a motor arranged to rotate said element in either of said directions, and means for controlling said motor including a member rotatable in one direction only and operative to cause said motor to rotate said element selectively in either of said directions, the direction of rotation of said element being dependent upon the rotary position of said member.

7. The combination with a fluid distributing element rotatable either in one direction or in an opposite direction and provided with teeth forming a worm gear, of a worm engaging said teeth, a motor arranged to rotate said worm either in one direction or in an opposite direction and means for energizing said motor including a member rotatable step by step in one direction only and operable to cause said motor to rotate either in one direction or in an opposite direction depending upon the position of rotation of said member.

8. The combination with a movable body of an element carried thereby and rotatable in either direction about an axis fixed with respect to said body, a second element rotatable about said axis in either direction and arranged to co-operate with said first mentioned element, stabilizing means arranged to hold said second element against rotation in space about said axis, a motor arranged to rotate said first mentioned element in either of said directions and means responsive to electrical impulses for causing said motor to be rotated selectively in one direction or in an opposite direction.

9. The combination with a movable body of an element carried thereby and rotatable in either direction about an axis fixed with respect to said body, a second element rotatable about said axis in either direction and arranged to co-operate with said first mentioned element, stabilizing means arranged to hold said second element against rotation in space about said axis, a motor arranged to rotate said first mentioned element in either of said directions and means responsive to electrical impulses for causing said motor to be rotated selectively in one direction or in an opposite direction, said last mentioned means including a source of energy, a rotary member arranged to distribute energy from said source, and delayed action circuit closing means controlled by said rotary member for operatively connecting said rotary member to said motor.

10. The combination with a movable body, of an element provided with a passage for fluid and arranged to rotate about an axis fixed with respect to said body, a second element arranged to rotate about said axis and provided with a passage for fluid having an inlet and an outlet, and stabilizing means arranged to hold said second element against rotation in space about said axis, a third element fixed with respect to said body and provided with a passage for fluid having an inlet and an outlet, a source of fluid under pressure communicating with said first mentioned inlet, said passage in said second element being arranged to provide communication between said passage and said third element, and a motor arranged to rotate said first mentioned element in either direction, and means responsive to electrical impulses for causing said motor to be rotated selectively in either direction, said last mentioned means including a source of energy, a rotary member arranged to distribute energy from said source and a sluggish relay controlled by said rotary member for operatively connecting said rotary member to said motor.

11. The combination with a movable body, of an element provided with two inlet passages and two exhaust passages and arranged to be rotated about an axis fixed with respect to said body, a second element provided with an inlet passage and an exhaust passage, and arranged to rotate about said axis, stabilizing means arranged to hold said second element against rotation in space about said axis, a third element fixed with respect to said body and forming a conveyer for fluid under pressure, a source of fluid under pressure communicating with said conveyer, said passages being so arranged that upon a suitable rotation of said first mentioned element, either of said inlet passages thereof may be brought separately into communication with said inlet passages of said second element and through said conveyer with said fluid under pressure and at the same time a corresponding one of said exhaust passages of said first mentioned element will be brought into communication with said exhaust passages of said second mentioned element, and a motor arranged to rotate said first mentioned element in either direction, and means responsive to electrical impulses for causing said motor to be rotated selectively in either direction, said last mentioned means including a source of energy, a rotary member arranged to distribute energy from said source and a sluggish relay controlled by said rotary member for operatively connecting said rotary member to said motor.

12. The combination with a movable body, of an element provided with two inlet passages and two exhaust passages and arranged to be rotated about an axis fixed with respect to said body, a second element provided with an inlet passage and an exhaust passage, and arranged to rotate about said axis, a gyroscope arranged to hold said second element against rotation in space about said axis, a third element fixed with respect to said body and forming a conveyer for fluid under pressure, a source of fluid under pressure communicating with said conveyer said passages being so arranged that upon a suitable rotation of said first mentioned element, either of said inlet passages thereof may be brought separately into communication with said inlet passages of said second element and through said conveyer with said fluid under pressure and at the same time a corresponding one of said exhaust passages of said first mentioned element will be brought into coommunication with said exhaust passages of said second mentioned element, and a motor arranged to rotate said first mentioned element in either direction, and means responsive to electrical impulses for causing said motor to be rotated selectively in either direction, said last mentioned means including a source of energy, a rotary member arranged to distribute energy from said source and a sluggish relay controlled by said rotary member for operatively connecting said rotary member to said motor.

13. The combination with a movable body, of an element carried thereby and rotatable in either direction about an axis fixed with respect to said body, a second element rotatable about said axis in either direction and arranged to co-operate with said first mentioned element, stabilizing means arranged to hold said second element against rotation in space about said axis, a motor arranged to rotate said first mentioned element in either of said directions, and means responsive to electrical impulses for causing said motor to be rotated selectively in one direction or in an opposite direction, said last mentioned means including a source of energy, a rotary member arranged to distribute energy from said source, and delayed action circuit closing means including a solenoid and a dash-pot controlled by said rotary member for operatively connecting said rotary member to said motor.

14. The combination with a movable body, of an element provided with two inlet passages and two exhaust passages and arranged to be rotated about an axis fixed with respect to said body, a second element provided with an inlet passage and an exhaust passage, and arranged to rotate about said axis, a gyroscope arranged to hold said second element against rotation in space about said axis, a third element fixed with respect to said body and forming a conveyer for fluid under pressure, a source of fluid under pressure communicating with said conveyer, said passages being so arranged that upon a suitable rotation of said first mentioned element, either of said inlet pas sages thereof may be brought separately into communication with said inlet passages of said second element and through said conveyer with said fluid under pressure and at the same time a corresponding one of said exhaust passages of said first mentioned element will be brought into communication with said exhaust passages of said second mentioned element, a cylinder fixed with respect to said body and having at each end thereof an inlet port and an exhaust port, said two inlet ports being arranged to communicate continuously with said two inlet passages of said first mentioned element during rotation of said first element through a considerable period, and the said two exhaust ports of said cylinder being arranged to communicate continuously with said two exhaust passages of said first mentioned element throughout the same period of rotation and a piston arranged in said cylinder to be reciprocated under the control of said elements, and a motor arranged to rotate said first mentioned element in either direction, and means responsive to electrical impulses for causing said motor to be rotated selectively in either direction, said last mentioned means including a source of energy, a rotary member arranged to distribute energy from said source and a sluggish relay controlled by said rotary member for operatively connecting said rotary member to said motor.

In testimony whereof I hereunto set my hand this 30th day of July 1918.

JOHN HAYS HAMMOND, Jr.